(12) United States Patent
Wang et al.

(10) Patent No.: US 12,417,712 B1
(45) Date of Patent: Sep. 16, 2025

(54) WRITING DEVICE ASSEMBLY AND WRITING CONTENT IDENTIFICATION METHOD

(71) Applicant: Shenzhen Zhongxin Chuangzhan Technology Co., Ltd., Guangdong (CN)

(72) Inventors: Ling Wang, Guangdong (CN); Jianhui Wang, Guangdong (CN); Dongxiao Ou, Guangdong (CN)

(73) Assignee: Shenzhen Zhongxin Chuangzhan Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/027,424

(22) Filed: Jan. 17, 2025

(30) Foreign Application Priority Data

Dec. 12, 2024 (CN) .......................... 202411824105.9

(51) Int. Cl.
G09B 7/02 (2006.01)
G06V 30/22 (2022.01)
G06V 30/32 (2022.01)

(52) U.S. Cl.
CPC ............... *G09B 7/02* (2013.01); *G06V 30/22* (2022.01); *G06V 30/32* (2022.01)

(58) Field of Classification Search
CPC ........... G09B 7/02; G06V 30/22; G06V 30/32
See application file for complete search history.

(56) References Cited

U.S. PATENT DOCUMENTS 10,671,191 B2 * 6/2020 He .......................... G06V 40/30
11,886,801 B1 * 1/2024 Li .......................... G06F 40/171
(Continued)

FOREIGN PATENT DOCUMENTS

CN 202071564 U 12/2011
CN 206312103 U 7/2017
(Continued)

OTHER PUBLICATIONS

Chinese Search Report corresponding to counterpart Chinese Patent Application 202411824105.9 dated Jan. 26, 2025, with English Translation.
(Continued)

*Primary Examiner* — Eddy Saint-Vil
(74) *Attorney, Agent, or Firm* — Renner, Otto, Boisselle & Sklar, LLP

(57) ABSTRACT

A writing device assembly and a writing content identification method are provided. The assembly includes a writing apparatus including a pressure sensing unit, an optical identification unit and a processor, and a writing medium having code points printed thereon. The pressure sensing unit generates a pressure sensing signal when sensing that the writing apparatus contacts the writing medium. The optical identification unit captures a code point image of the code points in the writing medium when the pressure sensing unit generates the pressure sensing signal, analyze the code point image to obtain a code point value, and send the code point value to the processor. The processor identifies a code point type of the code point value, analyzes the code point value to determine a writing trace when the code point type is identified to be a coordinate code, and identifies the writing trace to obtain writing content.

9 Claims, 8 Drawing Sheets

(56) References Cited

U.S. PATENT DOCUMENTS

| | | | | |
|---|---|---|---|---|
| 2008/0236902 | A1* | 10/2008 | Imaizumi | G01S 19/14 |
| | | | | 178/18.01 |
| 2010/0067674 | A1* | 3/2010 | Lee | G06F 3/03545 |
| | | | | 379/373.02 |
| 2014/0139340 | A1* | 5/2014 | Yang | G09B 19/003 |
| | | | | 340/573.1 |
| 2015/0301624 | A1* | 10/2015 | Lee | G06F 3/0321 |
| | | | | 345/179 |
| 2015/0336421 | A1* | 11/2015 | Neubauer | G09B 7/02 |
| | | | | 434/335 |
| 2016/0291956 | A1* | 10/2016 | Hargreaves | G06F 3/0383 |
| 2016/0299606 | A1* | 10/2016 | Go | G06F 3/0346 |
| 2019/0026647 | A1* | 1/2019 | Salisbury | G09B 7/00 |
| 2020/0007474 | A1* | 1/2020 | Zhang | G09B 7/02 |
| 2020/0209991 | A1* | 7/2020 | Wong | G06F 3/0346 |
| 2022/0291827 | A1* | 9/2022 | Duffy | G06V 30/226 |
| 2023/0135661 | A1* | 5/2023 | Lu | G06V 10/143 |
| | | | | 345/179 |
| 2023/0214028 | A1* | 7/2023 | Chen | G06V 30/1423 |
| | | | | 345/179 |
| 2023/0394721 | A1* | 12/2023 | Kadowaki | G06F 3/04883 |

FOREIGN PATENT DOCUMENTS

| | | |
|---|---|---|
| CN | 213958024 U | 8/2021 |
| CN | 114255470 A | 3/2022 |

OTHER PUBLICATIONS

Chinese First Office Action corresponding to counterpart Chinese patent application No. 202411824105.9 dated Jan. 27, 2025, with English translation.

Chinese Second Office Action corresponding to counterpart Chinese patent application No. 202411824105.9 dated Mar. 7, 2025, with English translation.

Chinese Rejection Decision of Patent corresponding to counterpart Chinese patent application No. 202411824105.9 dated Mar. 19, 2025, with English translation.

\* cited by examiner

WRITING DEVICE ASSEMBLY AND WRITING CONTENT IDENTIFICATION METHOD

CROSS-REFERENCE TO RELATED APPLICATION

This application is based on and claims the benefit of priority from Chinese Patent Application No. 202411824105.9, filed on Dec. 12, 2024, the entirety of which is incorporated by reference herein.

TECHNICAL FIELD

The present disclosure relates to the field of handwriting devices, and in particular, to a writing device assembly and a writing content identification method.

BACKGROUND

With the rapid development of education informatization, intelligent educational auxiliary devices have gradually become an important tool to improve learning efficiency and quality.

A handwriting device is an input device for intelligent educational auxiliary devices that allows users to interact with electronic devices (such as computers, tablets, mobile phones, and the like) by handwriting or drawing on a writing medium.

Currently, the handwriting device is limited to handwriting functionality, making it single-purpose. Therefore, how to improve the functionality of the handwriting device has become an urgent technical problem that needs to be solved.

SUMMARY

A main objective of an embodiment of the present disclosure is to provide a writing device assembly and a writing content identification method. The handwriting device instantly identifies and broadcasts the writing content when a user is writing, which can provide instant feedback on the learning results, increase the learning interactivity, and has a click-to-read and play functions as well, thus improving the functionality and practicality of the writing device.

In order to achieve the above objective, in a first aspect of the present disclosure, a writing device assembly is provided, which includes a writing apparatus and a writing medium. The writing apparatus includes a pressure sensing unit, an optical identification unit and a processor, and the writing medium has code points printed thereon, where:
  the pressure sensing unit is configured to generate a pressure sensing signal in response to sensing that the writing apparatus contacts the writing medium;
  the optical identification unit is configured to, in response to that the pressure sensing unit generates the pressure sensing signal, capture a code point image of the code points in the writing medium, analyze the code point image to obtain a code point value, and send the code point value to the processor; and
  the processor is configured to identify a code point type of the code point value, and in response to the code point type being identified to be a coordinate code, perform a coordinate code analysis on the code point value, determine a writing trace according to analysis results, and perform content identification on the writing trace to obtain writing content.

In some embodiments, the writing apparatus further includes an audio play unit configured to broadcast the writing content after the processor identifies the writing content.

In some embodiments, the processor is further configured to perform a semantic identification on the writing content to obtain writing semantics, and in response to the writing semantics indicating that the writing content is question data, generate answer data corresponding to the question data. The audio play unit is further configured to broadcast an answer audio corresponding to the answer data after the processor generates the answer data.

In some embodiments, the audio play unit is further configured to, in response to receiving a question broadcast instruction, broadcast a question audio corresponding to the question broadcast instruction.

The processor is further configured to compare the writing content with an answer corresponding to the question audio to obtain an answer comparison result, and determine a comparison result audio according to the answer comparison result.

The audio play unit is further configured to broadcast the comparison result audio after the processor determines the comparison result audio.

In some embodiments, the writing device assembly further includes a display module configured to display the writing content after the processor identifies the writing content.

In some embodiments, in response to the processor determining that the code point type is a click-to-read code by performing code point type identification on the code point value, the processor is further configured to determine click-to-read content according to the code point value; and
  the audio play unit is further configured to broadcast the click-to-read content after the processor determines the click-to-read content.

In some embodiments, the processor is further configured to analyze a writing angle based on an image sequence to obtain writing angle data, determine a real-time writing posture based on the writing angle data and the writing content, and generate a writing posture correction speech in response to a writing posture determination result indicating a wrong posture; and
  the audio play unit is further configured to broadcast the writing posture correction speech after the processor generates the writing posture correction speech.

In some embodiments, the pressure sensing unit includes a writing component and a sensing component;
  the writing component includes a first end that contacts the writing medium during writing and a second end that is opposite to the first end; and the second end of the writing component is provided with a conductive silicone pad and a first magnetic device; the sensing component includes a sensing terminal disposed opposite to the second end of the writing component, the sensing terminal is provided with a second magnetic device and unconnected first and second conductors, and the first magnetic device and the second magnetic device are disposed in magnetic repulsion; in response to the first end of the writing component being not in contact with the writing medium, the conductive silicone pad and the sensing terminal are separated under repulsion between the first magnetic device and the second magnetic device, the first conductor and the second conductor are not in conduction, so that no pressure sensing signal is generated; and in response to the first end of the writing component being in contact with the writing medium, and a contact pressure between the writing component and the writing medium being greater than the repulsion between the first magnetic device and the second magnetic device, the conductive silicone pad is in contact with the sensing terminal, so that the first conductor and the second conductor are in conduction to generate the pressure sensing signal; or the writing component includes a first end that contacts the writing medium during writing and a second end that is opposite to the first end, and the writing component is provided with a sliding block at the second end of the writing component; the sensing component includes a pressure sensor disposed opposite to the second end of the writing component; in response to the first end of the writing component being not in contact with the writing medium, the sliding block slides downward due to a gravity of the writing component, so that the sliding block is separated from the pressure sensor, and the pressure sensor does not generate the pressure sensing signal; and in response to the first end of the writing component being in contact with the writing medium, and a contact pressure between the writing component and the writing medium being greater than the gravity of the writing component, the sliding block moves upward to be in contact with the pressure sensor, so that the pressure sensor generates the pressure sensing signal.

In some embodiments, the writing apparatus further includes an audio acquisition unit, and in response to the processor determining that the code point type is a sound recording code by performing the code point type identification on the code point value, the processor is further configured to transmit a sound recording prompt voice to the audio play unit, and initiate a sound recording instruction to the audio acquisition unit;

the audio play unit is further configured to broadcast the sound recording prompt voice after receiving the sound recording prompt voice; and the audio acquisition unit is configured to perform sound recording after receiving the sound recording instruction and after the audio play unit plays the sound recording prompt voice.

According to a second aspect of the present disclosure, a writing content identification method is provided, which is applied to the processor in the writing apparatus of the writing device assembly in the first aspect of the present disclosure. The method includes:

continuously acquiring code point values returned by the optical identification unit to obtain a code point value sequence, wherein the code point values are obtained by analyzing code point images captured by the optical identification unit on the code points in the writing medium;

performing code point type identification on the code point values, and in response to a code point type indicated by the code point values being a coordinate code, performing coordinate identification on the code point value sequence to obtain a coordinate sequence, and drawing a writing trace according to the coordinate sequence; and calling a preset trace identification model to identify the writing trace to obtain writing content.

The present application provides a writing device assembly, which includes a writing apparatus and a writing medium. The writing apparatus includes a pressure sensing unit, an optical identification unit and a processor. The writing medium has code points printed thereon. The pressure sensing unit is configured to generate a pressure sensing signal when sensing that the writing apparatus contacts the writing medium. The optical identification unit is configured to capture a code point image of the code points in the writing medium when the pressure sensing unit generates the pressure sensing signal, analyze the code point image to obtain a code point value, and send the code point value to the processor. The processor is configured to identify a code point type of the code point value, perform a coordinate code analysis on the code point value and determine a writing trace according to analysis results when the code point type is identified to be a coordinate code, and the processor is further configured to perform content identification on the writing trace to obtain writing content.

Through the above method, the pressure sensing unit in the writing apparatus instantly senses the contact with the writing medium, instructs the optical identification unit to capture the code point image on the writing medium, and obtain the code point value by analyzing the code point image. When identifying the code point value type to be a coordinate code, the processor analyzes the code point value to determine a writing trace, and then identifies writing content based on the writing trace. The writing apparatus can instantly digitize the handwriting content without requiring additional devices for identification, which can improve identification efficiency and portability.

DETAILED DESCRIPTION

Figure 1:
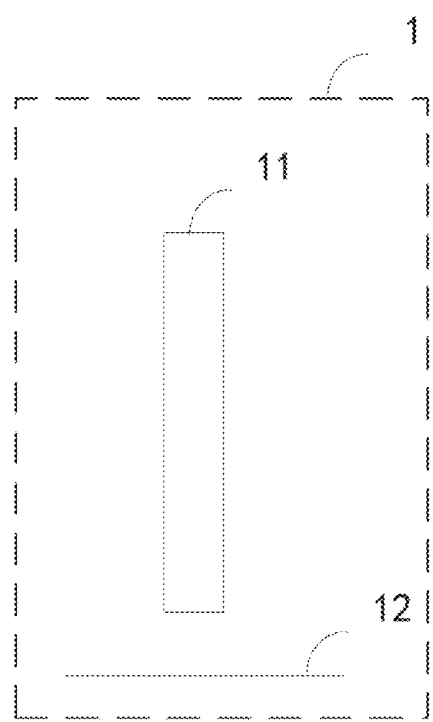
FIG. 1 is a schematic diagram showing a framework of a writing device assembly provided by an embodiment of the present disclosure.

In order to make the objectives, technical solutions and advantages of the disclosure clearer, the disclosure will be further described in detail below with reference to the accompanying drawings and embodiments. It should be understood that the specific embodiments described here are only used to explain the disclosure and are not intended to limit the disclosure.

It should be noted that functional modules are divided in the device schematic diagram and the logical sequence is shown in the flow chart, but in some cases, the device may be divided differently, or the steps shown or described may be performed in a different sequence from the flowchart. The terms such as "first", "second", and the like in the description, claims, and above-mentioned drawings are used to distinguish between similar objects, and are not necessarily used to describe a specific sequence or order.

As used herein, the word "exemplary" means "serving as an example, embodiment, or for illustration." Any embodiment described herein as "exemplary" is not necessarily to be construed as superior to or better than other embodiments.

In an embodiment of the present disclosure, the term "module" or "unit" refers to a computer program or a part of a computer program that has predetermined functions and works together with other related parts to achieve predetermined objectives, and can be implemented in whole or in part by using software, hardware (such as a processing circuit or memory) or a combination thereof. Similarly, a processor (or a plurality of processors or memories) may be used to implement one or more modules or units. Further, each module or unit may be part of an overall module or unit that contains the functionality of that module or unit.

In addition, in order to better explain the present disclosure, numerous specific details are shown in the following detailed description. It should be understood by those having ordinary skills in the art that the present disclosure may be implemented without certain specific details. In some examples, methods, means, elements and circuits that are well known to those having ordinary skills in the art are not described in detail in order to highlight the subject matter of the present disclosure.

Unless otherwise defined, all technical and scientific terms used herein have the same meaning as commonly understood by one of ordinary skill in the technical field to which the present disclosure belongs. The terms used herein are only for the purpose of describing embodiments of the present disclosure and are not intended to limit the present disclosure.

Firstly, several terms involved in the present disclosure are described.

Optical identification (OID) is an infrared optical identification technology, which differs from other optical identification technologies significantly in that the tiny code points of OID not only have the characteristics of confidentiality and low visual interference, but also can be hidden under the color pattern of printed matter, which is a low-cost solution that only requires ordinary printing inks.

The writing apparatus is an input and output device in intelligent educational auxiliary devices. Using previous click-to-read code points, the user can interact and make adjustments with electronic devices (such as computers, tablets, mobile phones, and the like) by handwriting or drawing on writing medium (including but not limited to papers). Although conventional pen readers can realize instant reading of book content, they lack coordinate identification, instant feedback, and determination of handwriting results. However, the handwriting identification technology focuses on digital conversion of handwriting input to other electronic devices.

Based on this, according to an embodiment of the present disclosure, a writing device assembly is provided herein, including a writing apparatus and a writing medium. The writing apparatus includes a pressure sensing unit, an optical identification unit, and a processor. The writing medium has code points printed thereon. The pressure sensing unit is configured to generate a pressure sensing signal when sensing that the writing apparatus contacts the writing medium. The optical identification unit is configured to capture a code point image of the code points in the writing medium when the pressure sensing unit generates the pressure sensing signal, analyze the code point image to obtain a code point value, and send the code point value to the processor. The processor is configured to identify a code point type of the code point value, perform a coordinate code analysis on the code point value and determine a writing trace according to analysis results when the code point type is identified to be a coordinate code, and the processor is further configured to perform content identification on the writing trace to obtain writing content.

Through the above method, the pressure sensing unit in the writing apparatus instantly senses the contact with the writing medium, instructs the optical identification unit to capture the code point image on the writing medium, and obtain the code point value by analyzing the code point image. When identifying the code point value type to be a coordinate code, the processor analyzes the code point value to determine a writing trace, and then identifies writing content based on the writing trace. The writing apparatus can instantly digitize the handwriting content without requiring additional devices for identification, which can improve identification efficiency and portability.

The writing device assembly and writing content identification method provided by an embodiment of the present disclosure are specifically described through the following embodiments. First, the writing device assembly in an embodiment of the present disclosure is described.

According to an embodiment of the present disclosure, relevant data may be processed based on artificial intelligence technology. Artificial intelligence (AI) is a theory, method, technology and application system that uses digital computers or digital computer-controlled machines to simulate, extend and expand human intelligence, perceive the environment, acquire knowledge and use knowledge to obtain the best results.

Basic artificial intelligence technologies generally include technologies such as sensors, dedicated artificial intelligence chips, cloud computing, distributed storage, big data processing technology, operation/interaction systems, mechatronics, and the like. Artificial intelligence software technologies mainly include computer vision technology, robotics technology, bioidentification technology, speech processing technology, natural language processing technology, and machine learning/deep learning, and the like.

The present disclosure may be used in a variety of general or specialized computer system environments or configurations, for example: personal computers, server computers, handheld or portable devices, tablet devices, multiprocessor systems, microprocessor-based systems, set-top boxes, programmable consumer electronics devices, network PCs, minicomputers, mainframe computers, distributed computing environment including any of the above systems or devices, and the like. The present disclosure may be described in the general context of computer-executable instructions, such as program modules, being executed by a computer. Generally, the program modules include routines, programs, objects, assemblies, data structures, and the like that perform specific tasks or implement specific abstract data types. The present disclosure may also be practiced in a distributed computing environment where tasks are performed by remote processing devices connected through a communication network. In a distributed computing environment, the program modules may be located in both local and remote computer storage media including storage devices.

It should be noted that in each specific implementation of the present disclosure, personal information is not involved. The user's writing content is identified and broadcast by the identification model built into the handwriting device, without the need to determine through the server, and thus the security of the user's personal information is guaranteed. When it comes to processing through the server based on user information, user behavior data, user history data, user location information and other data related to the user identity or characteristics, the user's permission or consent will first be obtained, and the acquisition, use and processing of these data will be in compliance with relevant laws, regulations and standards. In addition, when an embodiment of the present disclosure needs to obtain sensitive personal information of the user, the user's separate permission or consent will be obtained through a pop-up window or jumping to a confirmation page. Only after clearly obtaining the user's separate permission or consent, user-related data necessary for normal operation in an embodiment of the present disclosure can be obtained.

Referring to FIG. 1, which is a schematic diagram showing a framework of a writing device assembly 1 provided by an embodiment of the present disclosure, the writing device assembly 1 includes a writing apparatus 11 and a writing medium 12. The writing apparatus 11 may capture a code point image of the code points in the writing medium 12 when contacting the writing medium 12. When a code point value in the code point image is identified as a coordinate code, the code point value is analyzed to determine a writing trace, and the writing content is identified from the writing trace.

The writing device assembly provided by an embodiment of the present disclosure is described below.

Figure 2:
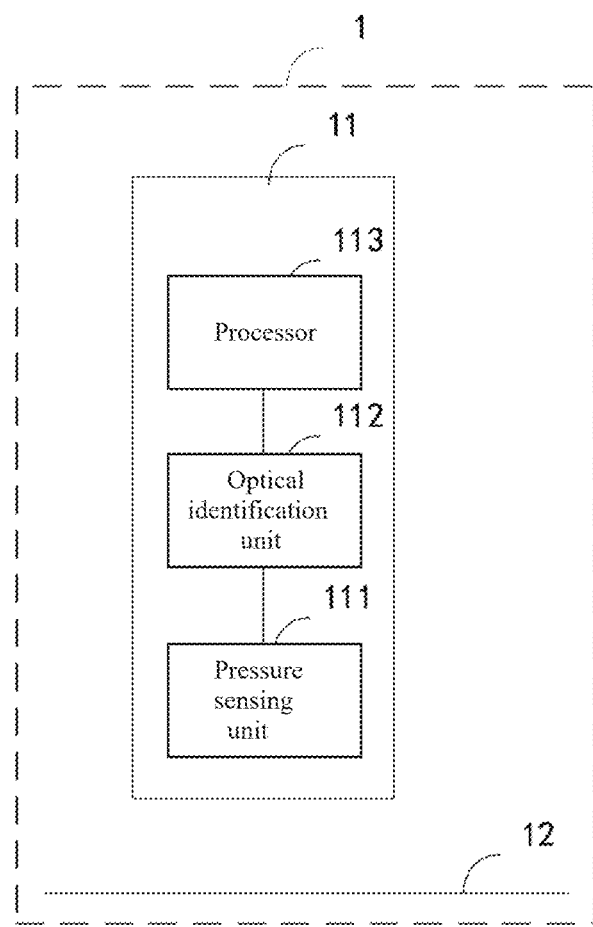
FIG. 2 is a schematic structural diagram of a writing device assembly provided by an embodiment of the present disclosure.

Referring to FIG. 2, which is a schematic structural diagram of a writing device assembly 1 provided by an embodiment of the present disclosure as shown in FIG. 2, the writing device assembly 1 includes: a writing apparatus 11 and a writing medium 12. The writing apparatus 11 includes a pressure sensing unit 111, an optical identification unit 112 and a processor 113. The writing medium 12 has code points printed thereon.

The pressure sensing unit 111 is configured to generate a pressure sensing signal when sensing that the writing apparatus contacts the writing medium 12.

The optical identification unit 112 is configured to capture a code point image of the code points in the writing medium when the pressure sensing unit 111 generates the pressure sensing signal, analyze the code point image to obtain a code point value, and send the code point value to the processor.

The processor 113 is configured to identify a code point type of the code point value, perform a coordinate code analysis on the code point value and determine a writing trace according to analysis results when the code point type is identified to be a coordinate code, and the processor is further configured to perform content identification on the writing trace to obtain writing content.

The writing apparatus 11 may be a tool or device for writing, and the user may write text or draw pictures through the writing apparatus 11.

The writing medium 12 may be a book with OID code points, a liquid crystal writing tablet, a whiteboard, and other media. The user may write on the writing medium 12 through the writing apparatus 11, and text or graphics with code points may be generated.

The pressure sensor 111 may respond to the pressure change and output an electrical signal proportional to the pressure change, and the current usage status of the writing apparatus 11 may be determined based on the change of the electrical signal. That is, the writing apparatus 11 may detect the current usage state on the writing medium 12 through the pressure sensor. The usage state includes a pressure state and a release state. The pressure state is the state when the user uses the writing apparatus 11 to write on the writing medium 12. For example, it may be a state in which the pressure is exerted on the writing component when detecting that the writing component of the writing apparatus 11 is in contact with the writing medium 12. The pressure sensor 111 may generate a pressure sensing signal to indicate the pressure state. The release state may be a state in which the pressure on the writing component of the writing apparatus 11 is released, that is, the writing component is separated from the writing medium 12, or the writing component is in contact with the writing medium 12 but does not receive pressure.

The optical identification unit 112 may be a camera integrated with optical identification technology, which can identify and process image data to identify specific patterns or objects. The writing apparatus 11 may scan the writing medium 12 through the optical identification unit 112 to obtain an image. The image acquisition by the optical identification unit 112 may be triggered by a pressure sensing signal, that is, the pressure sensing signal indicates that the user is writing. The optical identification unit 112 may capture the image on the writing medium 12 in real time, that is, capture the light refraction changes on the surface of the writing medium 12. These changes are usually caused by tiny code points (such as OID codes) printed on the paper. The optical identification unit 112 may generate a code point image based on the optical information, sense these tiny code points on the code point image, and convert these code points into electrical signals through image recognition technology. The optical identification unit 112 may decode these electrical signals to identify the code point values of the code points in the code point image, and may send the code point values to the processor 113.

The processor 113 may be a component that processes various data from the writing process. The processor 113 may identify the code point type of the code point value from the optical identification unit 112, and may perform different operations for different code point types. If the code point type of the code point value is a coordinate code, the processor 113 may analyze the coordinate code to obtain digital coordinates. These coordinates represent the position of the writing trace on the writing medium 12. That is, the processor 113 may determine the X and Y coordinate values of each coordinate code based on the coordinate code. After having the coordinate values, the processor 113 may connect these points to form a writing trace. The processor 113 may further be integrated with a machine learning model or a deep learning model. These identification models can learn from a large number of handwriting samples and may identify the handwriting content corresponding to the writing trace. Then for the writing trace determined by the processor 113, the writing trace may be input into the learning model for content identification to obtain the writing content written by the user on the writing medium 12.

The identification model may be selected based on specific application scenarios and requirements, which may include recurrent neural network (RNN), long short-term memory (LSTM), the combination of convolutional neural network (CNN) and RNN (such as CRNN), Transformer, and the like. The identification model may be obtained by training the initial model with sample features and labels corresponding to the sample features as sample data. The correspondence between the sample features and the labels may be manually annotated, or may be downloaded from the Internet. The sample data are input into the initial model, and the parameters of the model are adjusted by backpropagation algorithm, so that the model can accurately map the handwriting trace coordinate data to the writing content. Further, the identification model may be retrained based on the current user's handwriting trace and user feedback to improve the personalization of the identification model.

In the writing device assembly provided by an embodiment of the present disclosure, the pressure sensing unit in the writing apparatus instantly senses the contact with the writing medium, instructs the optical identification unit to capture the code point image on the writing medium, and obtains the code point value by analyzing the code point image. When the code point value type is identified to be a coordinate code, the processor analyzes the code point value to determine a writing trace, and then identifies writing content based on the writing trace. The writing apparatus can instantly digitize the handwriting content without requiring additional devices for identification, which can improve identification efficiency and portability.

Figure 3:
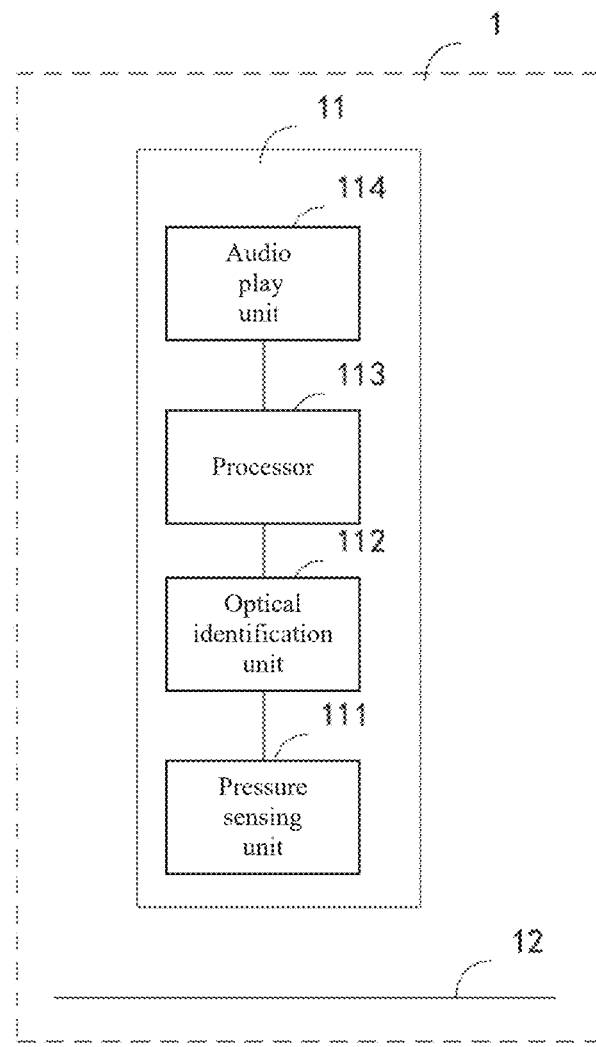
FIG. 3 is another schematic structural diagram of a writing device assembly provided by an embodiment of the present disclosure.

In a feasible implementation, referring to another schematic structural diagram of the writing device assembly 1 shown in FIG. 3, the writing apparatus 11 further includes an audio play unit 114. The audio play unit 114 is configured to broadcast writing content after the processor identifies the writing content.

The audio play unit 114 may convert the writing content into audio signals after the writing content is determined. For example, TTS technology is used to preprocess the input writing content, including text standardization, punctuation processing, number and date conversion, and the like, to meet the requirements of speech synthesis. Next, a language model may be used to perform text analysis to determine the most appropriate speech output. Finally, the audio play unit 114 will broadcast the audio signal through a loud speaker or other audio output devices. The writing content may be played offline instantly to improve the interactive effect.

In a feasible implementation, the processor 113 is further configured to:
  perform a semantic identification on the writing content to obtain writing semantics;
  when the writing semantics indicates that the writing content is question data, the processor 113 is further configured to generate answer data corresponding to the question data; and
  the audio play unit 114 is further configured to broadcast an answer audio corresponding to the answer data after the processor generates the answer data.

The semantic identification may refer to understanding and interpreting the deep meaning and intention contained in natural language text. It may involve natural language processing (NLP) technology, including syntax analysis, semantic analysis and context understanding, that is, it not only focuses on the meaning of text words, but also understands the meaning of these words in sentences and chapters. This means that the semantic identification needs to perform semantic analysis and ambiguity elimination at the text, vocabulary, syntax, morphology, and chapter levels, as well as the corresponding meaning reorganization.

The writing semantics may be the deep meaning and intention contained in the writing content, which goes beyond the superficial form of the text and involves the understanding and interpretation of the writing content. For example, understand and interpret the writing content by understanding the sentence structure and combining contextual explanations, emotional analysis and context.

The question data may refer to questions expressed in written form. When determining that the writing content is question data based on the writing semantics, the processor 113 may determine the type of question, such as fact query, suggestion request, operation instruction, and the like, in order to select an appropriate answer generation strategy.

The answer data may be a standard answer corresponding to the question data. The processor 113 may retrieve the relevant information corresponding to the question data in the internal knowledge base or by accessing external databases and Internet resources, and determine the standard answer through the relevant information. The answer data may also be obtained by the processing unit using the built-in mathematical engine or calculator function to carry out logical analysis and calculation of the extracted calculation expression. Exemplarily, if the writing content is "1+1", then the writing semantic identification may be a mathematical calculation of adding 1 and 1, and then the processor 113 may generate the answer "2" corresponding to the mathematical calculation. The audio play unit 114 may perform text normalization, punctuation processing, number and date conversions, and the like on the answer data to adapt to the requirements of speech synthesis, and then perform text analysis via the language model to determine the most appropriate answer audio, and broadcast the answer audio. Students can not only see their scores, but get feedback by listening, which increases interactivity and interest in learning. The content of the broadcast may include "Your calculation results are correct" or "There is a small mistake, please check your calculation process again", or the like. The specific content of the broadcast will be determined based on the actual evaluation results and design needs. In this way, the system not only provides immediate feedback, but enhances the learning experience, making the learning process more dynamic and interactive.

In a feasible implementation, the audio play unit 114 is further configured to:
  when receiving a question broadcast instruction, broadcast a question audio corresponding to the question broadcast instruction;
  the processor 113 is further configured to: compare the writing content with an answer corresponding to the question audio to obtain an answer comparison result, and determine a comparison result audio according to the answer comparison result; and
  the audio play unit 114 is further configured to broadcast the comparison result audio after the processor 113 determines the comparison result audio.

The question broadcast instruction may be an instruction that instructs the writing apparatus 11 to broadcast the question. The question broadcast instruction may be determined by the writing apparatus 11 scanning code points on the writing medium 12, or may be generated by the user through controls on the writing apparatus 11, or may be sent by the user to the writing apparatus 11 via other devices. Correspondingly, the question broadcast instruction may be instructed by the user to the writing apparatus 11 before writing, that is, the current writing content of the user may be the user answer written based on the broadcast question.

The question audio may be an audio signal that can be directly broadcast by the loud speaker. The question audio may be directly stored in the writing apparatus 11, or may be obtained by the writing apparatus 11 from other devices, or may be the question content converted, after receiving the question broadcast instruction, by the writing apparatus saving the question content.

The answer corresponding to the question audio may be a standard answer to the question audio. The standard answer may be retrieved by the writing apparatus 11, that is, the writing apparatus 11 may pre-store the correspondence between the question audio and the standard answer, or may be a standard answer directly generated by the writing apparatus 11 to the question content corresponding to the question audio.

The answer comparison result may be a conclusion drawn by the processor 113 after comparing the answer written by the user with the correct answer. This result may be a simple match or mismatch, or a detailed similarity score. The processor 113 may perform a text preprocessing on the user answer indicated by the writing content and the standard answer, and use a specific algorithm to compare the similarity of the two texts. This may include simple string matching algorithms, edit distance algorithms such as Levenshtein distance, or more complex natural language processing techniques such as semantic similarity analysis. The processor 113 interprets the comparison results according to the results of the comparison algorithm. If it is a simple match/mismatch result, the processor will directly conclude whether the answer is correct or not. In the case of a similarity score, the processor may determine whether the answer is close enough to the correct answer based on a preset threshold.

The comparison result audio may be an audio signal which is broadcast to the user by the audio play unit 114 after the processor 113 completes the comparison between the writing content and the correct answer and converts the comparison result into voice information. The processor 113 may convert the comparison result into easy-to-understand text information. For example, if the comparison result shows that the user answer is exactly the same as the correct answer, the comparison result audio may be "Your answer is absolutely correct". If the answer is partially correct, the comparison result audio may be "Your answer is partially correct, but there are some parts for improvement". If the answer is incorrect, the comparison result audio may be "Your answer is incorrect, please refer to the correct answer below".

Figure 4:
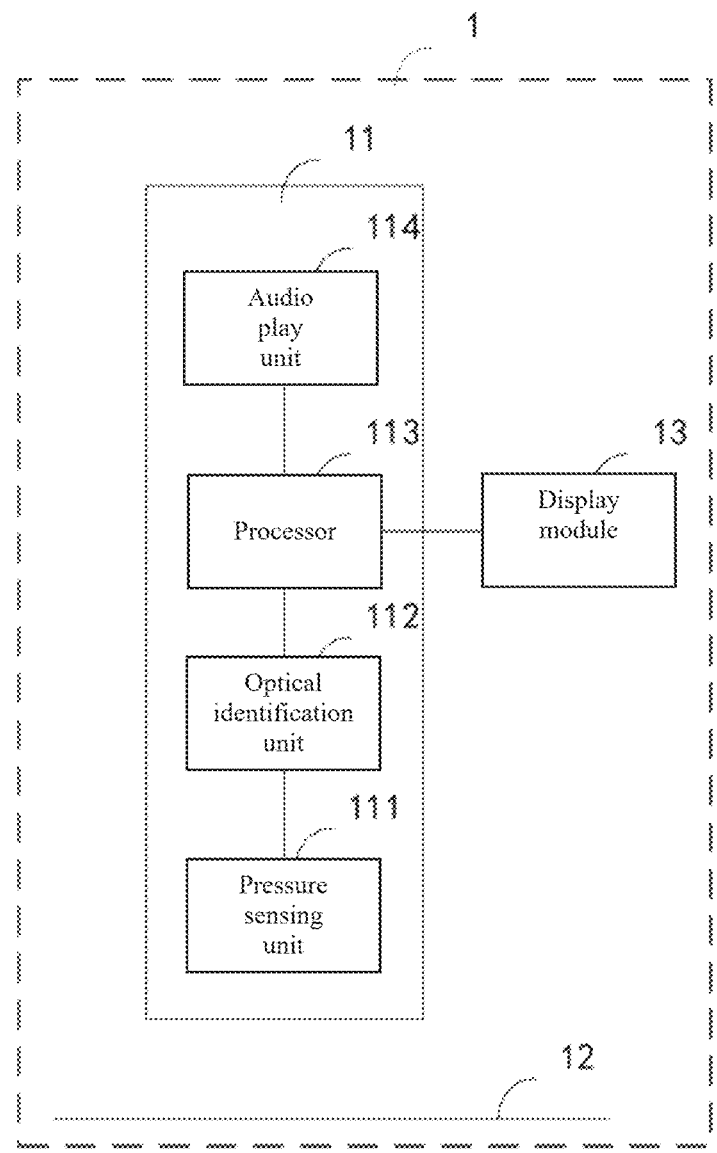
FIG. 4 is another schematic structural diagram of a writing device assembly provided by an embodiment of the present disclosure.

In a possible implementation, referring to another schematic structural diagram of the writing device assembly shown in FIG. 4. the writing device assembly 1 further includes a display module 13 configured to:
display the writing content after the processor identifies the writing content.

The display module 13 may be a component that displays the writing content on the display screen. The display module 13 may format the writing content, including adjusting the font size, type, color and layout, and the like, to ensure that the content is clear and readable on the screen. The display module 13 may be configured on the writing apparatus 11, that is, the processor 113 may transmit the writing content to the display module 13 through internal wiring after identifying the writing content, and the display module 13 then displays the writing content on the screen. The display module 13 may further be a separate device from the writing apparatus 11. The processor 113 in the writing apparatus 11 may send the writing content to the display module 13 through wireless communication after identifying the writing content, and the display module 13 then displays the writing content. For example, the display module 13 is a separate device from the writing apparatus 11, as shown in FIG. 4.

In a feasible implementation, when the processor 113 performs code point type identification on the code point value and determines that the code point type is a click-to-read code, the processor 113 is further configured to determine click-to-read content according to the code point value; and
the audio play unit 114 is further configured to broadcast the click-to-read content after the processor 113 determines the click-to-read content.

The click-to-read codes may be code points arranged according to certain rules on the writing medium 12, and each click-to-read code represents a specific piece of information or instruction. When identifying the code point type of the code point value, the processor 113 may analyze whether the code point value is a click-to-read code. After identifying the click-to-read code, the processor 113 may look up the click-to-read content corresponding to the information indicated by the click-to-read code in a database inside the writing apparatus 11 or in a database connected to an external server. The click-to-read content in the database may include text, audio, video and other multimedia information. After obtaining the click-to-read content corresponding to the click-to-read code from the database, the processor 113 sends the generated speech data to the audio play unit 114. The audio play unit 114 may perform necessary processing, such as decoding, format conversion, and the like, to convert the speech data into a format suitable for play, and then play the converted data via a loud speaker or other audio output devices so that users can listen to the click-to-read content.

In a feasible implementation, the processor 113 is further configured to:
analyze a writing angle based on the image sequence to obtain writing angle data;
determine a real-time writing posture based on the writing angle data and the writing content;
generate a writing posture correction speech when a writing posture determination result indicates a wrong posture; and
the audio play unit 114 is further configured to broadcast the writing posture correction speech after the processor generates the writing posture correction speech.

The image sequence may be a sequence composed of a series of still images which are arranged in time sequence and may represent process images in a certain time sequence or in a dynamic process. In an embodiment of the present disclosure, it may be the image sequence continuously captured by the optical identification unit 112 from the writing actions.

The writing angle data may refer to the angle information between the writing component of the writing apparatus 11 and the writing medium 12 during the writing process of the user. The image sequence may include features related to the writing angle, such as the position of the writing component, the direction of the stroke, and the angle between the stroke and the writing medium, and the like. The writing angle may be calculated based on the position change of the writing component. For example, when the writing apparatus 11 is perpendicular to the writing medium 12, the writing head of the writing component, such as the pen tip, is located in the center of the stroke, and the distance between the deepest part of the stroke mark and the edge is the same. When the writing apparatus 11 is not perpendicular to the writing medium 12, the pen tip position is deviated to one side of the stroke, and the distance between the deepest part of the stroke mark and the edges is unequal. Through the measurement and statistics of this ratio, the writing angle of the stroke may be characterized. Then the pen tip angle changes in the image sequence may be analyzed, and the dynamic changes of the writing angle during the writing process may be determined.

The writing posture determination result may refer to a conclusion about whether the writing posture is correct or not by analyzing various data during the writing process. The writing angle in the writing angle data may be compared with a preset standard angle to determine whether the writing posture is correct. If the angle goes beyond the normal range, it may be considered that there is a problem with the writing posture. The standard angle may be obtained based on best practices in ergonomics, medical research, and writing habits to reduce hand and wrist stresses. The processor 113 may also determine the writing posture combined with the writing content, such as writing coherence, stroke sequence, and the like. In terms of writing coherence, if the writing content is determined to be coherent and smooth, it may indicate that the writing posture is more natural and comfortable. If there are frequent pauses, corrections, or sudden changes in handwriting, it may be determined that there is a problem with the writing posture. In terms of the stroke sequence, the direction and sequence of the strokes in the writing content may reflect the movement trace of the pen tip when the user writes. If the stroke sequence is chaotic or the stroke direction is wrong, it may be determined to be caused by the improper writing posture.

The writing posture correction speech may be an audio signal that guides and corrects the user's writing posture through speech. When the processor 113 determines that the writing angle in the writing angle data exceeds the normal range, or the writing content is incoherent or the stroke sequence is incorrect, it may be determined that the user has a wrong posture, and a text that corrects the user writing posture may be generated. The correction text may include the following:

Pointing out specific problems: for example, "The angle of your pen tip to the paper is too large, which may cause hand fatigue."

Providing right posture guidance: for example, "Try to hold the pen tip at a 45-degree angle to the paper."

Suggested exercises or adjustments: for example, "Try to relax your hand gripping the pen to let the pen rest naturally between your index finger and thumb."

Encouraging language: for example, "Keep a right posture can improve writing efficiency and prevent hand pain."

The processor 113 may use text-to-speech technology to convert the correction text into a writing posture correction speech and send the writing posture correction speech to the audio play unit 114. The audio play unit 114 receives the writing posture correction speech and controls a loud speaker or other audio output devices to play the writing posture correction speech. The user may then hear instructions on how to correct the writing posture.

In addition to analyzing the writing angle through the image sequence, the writing angle may further be analyzed directly based on the code points. For example, the information that may be obtained by analyzing the coordinate code of the code point image includes not only coordinates, but also angle information. The assembly position of the optical identification unit 112 on the writing apparatus 11 is fixed. As the writing apparatus 11 rotates, the images captured by the optical identification unit 112 are also different. Correspondingly, the arrangement of the code points captured at different capturing angles will also change. The coordinates of the handwriting trace and the capturing angle may be determined based on the captured arrangement. For example, when captured from a top-down perspective, the code points may appear in a specific arrangement pattern, while the arrangement pattern will be different when captured from a down-top perspective. By analyzing these arrangement patterns, the capturing angle, that is the direction of the code point relative to the camera, may be inferred, which may also be called the angle of the writing component of the writing apparatus 11 relative to the writing medium 12. Correspondingly, whether the writing posture of the user is wrong may be determined based on the difference between the capturing angle and the standard angle.

Figure 5:
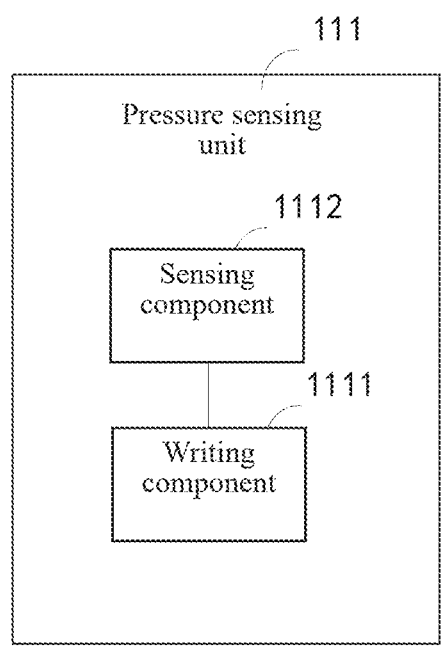
FIG. 5 is another schematic structural diagram of the writing device assembly provided by an embodiment of the present disclosure.

In a feasible implementation, referring to another schematic structural diagram of the writing device assembly 1 shown in FIG. 5, the pressure sensing unit 111 includes a writing component 1111 and a sensing component 1112;

the writing component 1111 includes a first end that contacts the writing medium during writing and a second end that is opposite to the first end; and the second end of the writing component is provided with a conductive silicone pad and a first magnetic device;

the sensing component 1112 includes a sensing terminal disposed opposite to the second end of the writing component 1111, the sensing terminal is provided with a second magnetic device and unconnected first and second conductors, and the first magnetic device and the second magnetic device are disposed in magnetic repulsion;

when the first end of the writing component 1111 is not in contact with the writing medium, the conductive silicone pad and the sensing terminal are separated under repulsion between the first magnetic device and the second magnetic device, the first conductor and the second conductor are not in conduction, without generation of pressure sensing signal; and when the first end of the writing component 1111 is in contact with the writing medium, and a contact pressure between the writing component and the writing medium is greater than the repulsion between the first magnetic device and the second magnetic device, the conductive silicone pad is in contact with the sensing terminal, such that the first conductor and the second conductor are in conduction to generate the pressure sensing signal; or, the writing component includes a first end that contacts the writing medium during writing and a second end that is opposite to the first end; and the writing component is provided with a sliding block at the second end of the writing component;

the sensing component includes a pressure sensor disposed opposite to the second end of the writing component;

when the first end of the writing component is not in contact with the writing medium, the sliding block slide downward due to a gravity of the writing component, the sliding block is separated from the pressure sensor, and the pressure sensor does not generate the pressure sensing signal; and when the first end of the writing component is in contact with the writing medium, and a contact pressure between the writing component and the writing medium is greater than the gravity of the writing component, the sliding block moves upward to be in contact with the pressure sensor, and the pressure sensor generates the pressure sensing signal.

The pressure sensing unit 111 is composed of a writing component 1111 and a sensing component 1112. The writing component 1111 is designed with two ends, the first end is used to contact the writing medium, and the second end is opposite to the sensing component 1112. At the second end of the writing component 1111, a conductive silicone pad and a first magnetic device are mounted. The conductive silicone pad may be a silica gel material that is doped with conductive particles (such as metal powder or carbon black) to achieve conductive function. The conductive silicone pad contains evenly dispersed conductive particles inside, and these particles form conductive paths in the silicone pad. When the conductive silicone pad is not subject to pressure, these conductive particles are disconnected and therefore does not form a closed circuit. When pressure is applied, the conductive silicone pad deforms and the conductive particles are squeezed closer together, resulting in forming a continuous conductive path. The conductive silicone pad may deform to form a conductive path when the first end of the writing component 1111 contacts the writing medium and exerts a certain pressure on the writing medium, and contacts the sensing terminal of the sensing component 1112 to achieve a circuit connection.

The sensing terminal of the sensing component 1112 is equipped with a second magnetic device and two unconnected conductors, namely a first conductor and a second conductor. The first magnetic device and the second magnetic device may be designed to be in magnetic repulsion. This repulsion ensures that when there is no writing pressure, the first magnetic device drives the conductive silicone pad to remain separated from the sensing terminal. At this time, the conductive particles inside the conductive silicone pad are disconnected, such that the first conductor and the second conductor are not conductive. In the non-contact state, due to the repulsion between the first magnetic device and the second magnetic device, the conductive silicone pad is kept away from the sensing terminal. The first conductor is not in communication with the second conductor, thus the current will not pass therethrough, and the sensing component 1112 is not triggered. When the user is writing, the first end of the writing component 1111 is subject to a pressure from the writing medium. When the first end is pressed toward the inside of the writing component 1111, that is, the pressure exerted exceeds the repulsion between the first magnetic device and the second magnetic device, the conductive silicone pad overcomes the magnetic repulsion and contacts the sensing terminal and deforms. At this time, the conductive silicone pad is in communication with the first conductor and the second conductor, such that the current can pass therethrough. At this time, the sensing component 1112 is triggered to generate a pressure sensing signal.

The conductive silicone pad works in the pressure sensing unit through its conductivity and elasticity, converting pressure changes during writing or drawing into electrical signals, thereby realizing the pressure sensing function. This design enables the pressure sensing unit to accurately detect and respond to writing pressure, instantly sensing the writing of the user.

In addition to using magnetic devices to control the contact between the conductive silicone pad and the sensing terminal, a pressure sensor may also be used to detect the writing status of the writing component 1111. When the first end of the writing component 1111 is not in contact with the writing medium, due to the action of gravity, the writing component 1111 slides downward, causing the sliding block disposed at the second end to separate from the pressure sensor in the sensing component 1112. In this state, the pressure sensor does not detect pressure and therefore does not generate any pressure sensing signal.

However, when the first end of the writing component 1111 is in contact with the writing medium and the pressure exerted is large enough to exceed the gravity of the writing component 1111 itself, the second end of the writing component 1111 will rise due to the pressure, causing the sliding block to contact with the pressure sensor. At this time, the pressure sensor is affected by the pressure of the sliding block, thereby generating a pressure sensing signal.

Figure 6:
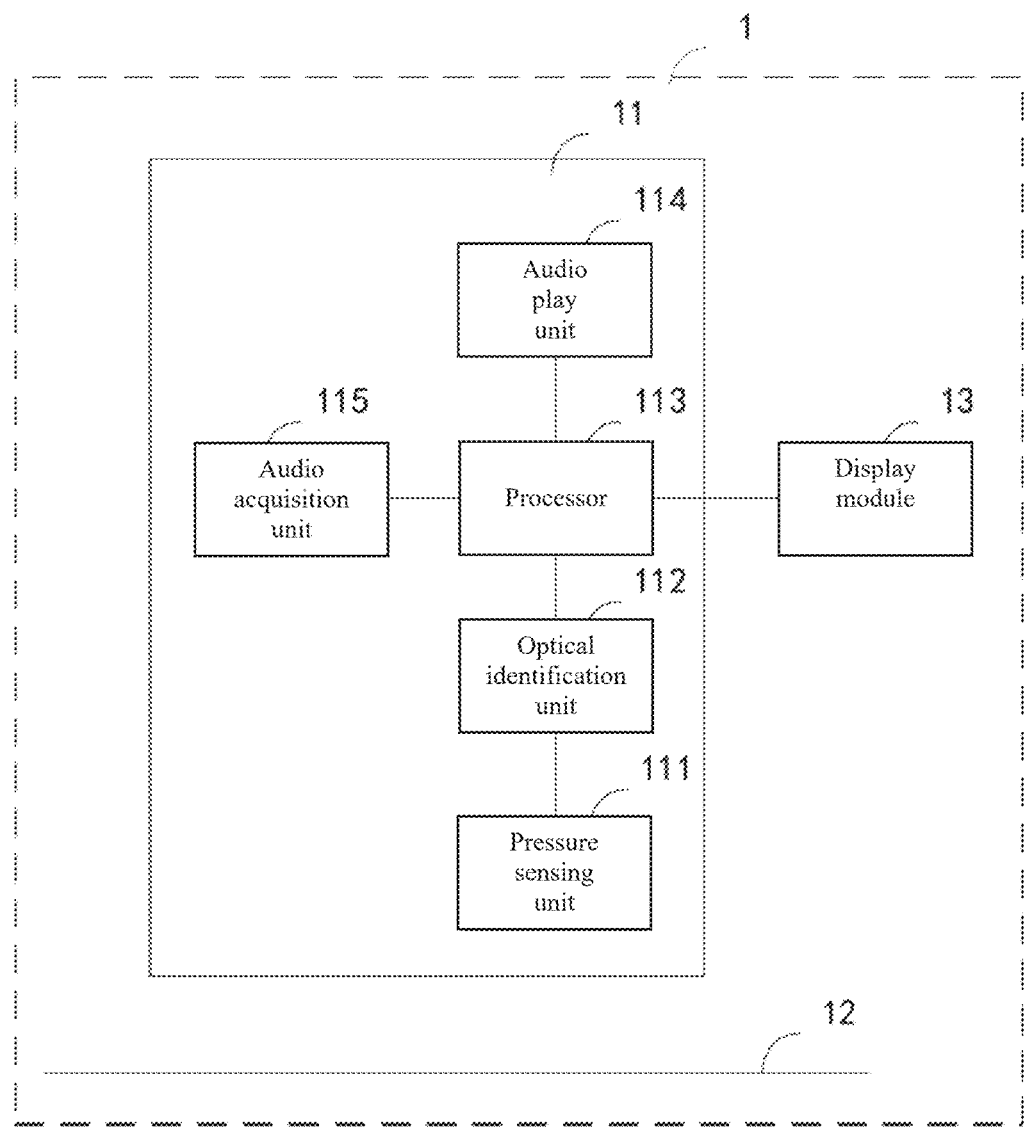
FIG. 6 is another schematic structural diagram of a writing device assembly provided by an embodiment of the present disclosure.

In a feasible implementation, referring to another schematic structural diagram of the writing device assembly shown in FIG. 6, the writing apparatus 11 further includes an audio acquisition unit 115. When the processor 113 performs the code point type identification on the code point value and determines that the code point type is a sound recording code, the processor 113 is further configured to transmit a sound recording prompt voice to the audio play unit 114, and initiate a sound recording instruction to the audio acquisition unit 115;

the audio play unit 114 is further configured to broadcast the sound recording prompt voice after receiving the sound recording prompt voice; and the audio acquisition unit 115 is configured to perform sound recording after receiving the sound recording instruction and after the audio play unit plays the sound recording prompt voice.

In this implementation, the writing medium 12 may also be provided with a sound recording code. The sound recording code may be a code point that identifies the recording operation to be needed. When the code point image includes the sound recording code, that is, when the processor 113 identifies that the code type is a sound recording code from the code point value, it may be determined that the user needs to record.

The processor 113 may transmit a sound recording prompt voice to the audio play unit 114. The purpose of this voice is to notify the user that the device is about to start recording and ensure that the user knows when to start speaking. After receiving the sound recording prompt voice, the audio play unit 114 will immediately play it so that the user may hear the prompt that the sound recording is about to start.

While the audio play unit 114 broadcasts the sound recording prompt voice, the processor 113 may also transmit a recording instruction to the audio acquisition unit 115. This instruction indicates the audio acquisition unit 115 to prepare to start recording. Once the audio play unit 114 completes the broadcast of the sound recording prompt voice, the audio acquisition unit 115 may enable the recording function and start capturing audio data. It ensures the smoothness and accuracy of the recording process, avoids any delays at the beginning of recording, and ensures the integrity and clarity of the recording content.

In an example, the optical identification unit may be an infrared camera, the processor may be a main control processor, and the audio play unit may be a horn.

The OID infrared optical camera may capture the writing and click-to-read actions of the user on books, LCD tablets or whiteboards, that is, based on the user's writing operation, the code point image is obtained from the writing medium, and the code point image is analyzed to obtain the code point value.

The main control processor 402 is a built-in high-performance processor that runs the local handwriting recognition algorithm and click-to-read control program to realize fast processing and response of data. When the code point type of the code point value is a click-to-read code, the click-to-read content corresponding to the click-to-read code value may be obtained from the local database. When the code point type of the code point value is a coordinate code, the writing trace may be determined from the coordinate code value, and the preset built-in trace identification model is called to analyze the writing trace to obtain the writing content of the user.

The horn 403 is used to broadcast the click-to-read content and the identified writing content while supports recording and listen and repeat functions. After obtaining the identification results, the corresponding results and some of the system's own prompts, recordings, and the like are broadcast.

The handwriting device identifies the writing content broadcasts it during the user's writing process, which can provide instant feedback on the writing content, increase the interactivity of learning, and improve the functionality and practicality of the handwriting device.

The writing device assembly is described above, and the writing content identification method executed by the processor in the writing device assembly is described below.

Figure 7:
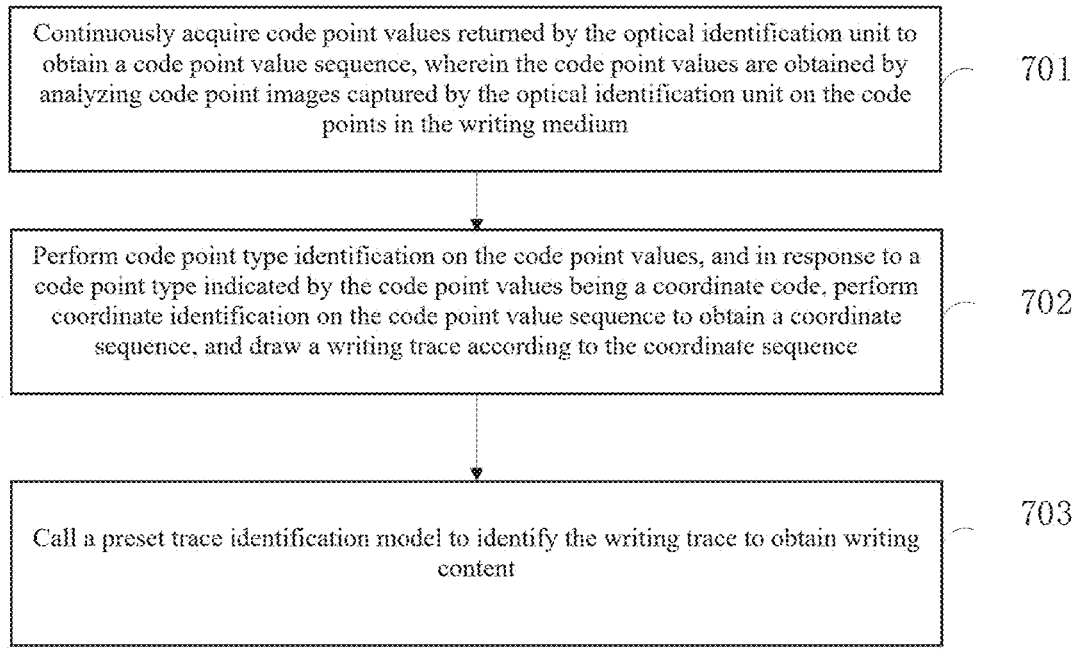
FIG. 7 is a schematic flowchart of a writing content identification method provided by an embodiment of the present disclosure.

Referring to FIG. 7, which is a schematic flowchart of the writing content identification method in an embodiment of the present disclosure, which includes the following steps.

At step 701, code point values returned by an optical identification unit are continuously acquired to obtain a sequence of code point values, wherein the code point values are obtained by analyzing code point images captured by the optical identification unit on code points in a writing medium.

The code point value may be the numerical value or identification indicated by the data unit composed of a dot matrix including a plurality of code points. For example, every 6×6=36 points constitute a minimum data unit. These dot matrixes may represent a large number of arrangements for representing numbers.

The code point value sequence may be a sequence of code point values in a series of code point images continuously captured by the optical identification unit, that is, it includes code points at different time points, and code point values in different states or positions can be obtained.

The code point image may be an image captured with OID code points, that is, the image captured by the optical identification unit from the writing medium with OID code points may be called a code point image. When the optical identification unit receives the pressure sensing signal sent by the pressure sensing unit, the code point image may be captured by photographing the code points in the writing medium.

The writing medium may be books, LCD handwriting tablets or other medium with OID code points.

The optical identification unit may be a camera integrated with optical identification technology and is responsible for capturing images.

The pressure sensing unit may be a unit in the writing apparatus used to detect pressure changes when the writing component of the writing apparatus comes into contact with the writing medium.

The pressure sensing signal may be a signal indicating that the user is writing using the writing apparatus. When the pressure on the writing component of the writing apparatus reaches a preset value, a pressure sensing signal may be generated indicating that the writing apparatus is currently writing.

At step 702, code point type identification is performed on the code point values, and when a code point type indicated by the code point values is a coordinate code, a coordinate identification is performed on the sequence of the code point values to obtain a coordinate sequence, and a writing trace is drawn according to the coordinate sequence.

The code point type may be a specific coded function type composed of a plurality of OID code points, and the code points of different functional types are arranged in different forms.

The coordinate code may be a data unit that can be used to determine coordinate information in a dot matrix composed of a plurality of code points. These dot matrixes may represent a large number of arrangements for representing numbers or coordinate information, such as X-axis and Y-axis coordinates on a writing medium. These code points often have unique visual characteristics, such that they can be distinguished from the background. The processing unit may determine the specific coordinates of the writing operations based on the corresponding coordinate information in these code points to determine the handwriting trace coordinates. This coordinate information may be predefined during the OID encoding process, which allows the system to accurately map handwriting trace to physical locations on the writing medium.

The coordinate sequence may be a set of a series of coordinates, that is, a set of coordinates corresponding to each code point value in the code point value sequence. The processor may identify the dot matrix in each code point value in the code point value sequence, analyze the coordinates corresponding to the dot matrix based on the algorithm, and arrange these coordinates in sequence based on the acquisition sequence of the code point values in the code point value sequence to form the coordinate sequence.

The writing trace may be a combination of strokes simulated and drawn based on the coordinate sequence, which may simulate the sequence of strokes during the user's writing process, and may also be understood as simulating the movement path of the writing component on the writing medium.

At step 703, a preset trace identification model is called to identify the writing trace and obtain writing content.

The preset trace identification model may be an identification model built into the writing apparatus to identify the user writing content. The identification model may be selected according to specific application scenarios and needs, and may include recurrent neural network (RNN), long short-term memory (LSTM), the combination of convolutional neural networks (CNN) and RNN (such as CRNN), Transformer, and the like. The identification model may be obtained by training the initial model with sample features and labels corresponding to the sample features as sample data. The correspondence between the sample features and the labels may be manually annotated, or may be downloaded from the Internet. The sample data are input into the initial model, and the parameters of the model are adjusted by backpropagation algorithm, so that the model can accurately map the handwriting trace coordinate data to the writing content. Further, the identification model may be retrained based on the current user's handwriting trace and user feedback to improve the personalization of the identification model.

In a possible implementation, the code point type in the code point value may further be a click-to-read code, which identifies different content through different combinations of codes. These codes are usually very small, hidden in the page, invisible to the naked eye, and may be identified by OID. The writing medium in the embodiment of the present disclosure may be equipped with click-to-read codes arranged according to certain rules, and each click-to-read code represents a specific piece of information or instruction. After obtaining the code point value, the processor may first identify whether the code point value is a click-to-read code. After identifying the click-to-read code, the processor may look up the click-to-read content corresponding to the information indicated by the click-to-read code in a database inside the writing apparatus 11 or in a database connected to an external server. The click-to-read content in the database may include text, audio, video and other multimedia information. After obtaining the click-to-read content corresponding to the click-to-read code from the database, necessary processing, such as decoding, format conversion, and the like, may be performed to convert the click-to-read content data into a format suitable for play, and then broadcast by audio play unit.

In a possible implementation, the processor may further save the writing content in a local database, and generate the learning results of the user in the local database based on the writing content.

The learning results may be determined by the question and answer results indicated by the writing content, that is, the writing content includes questions and answers. The processing unit may determine the writing accuracy of the user based on the correlation between the answers and the questions, and the writing accuracy is the learning results of the user. Correspondingly, the processing unit may distinguish between the questions and the answers in the writing content.

The learning results may further be the learning progress of the user, that is, the writing content has corresponding writing time. In the local database, the form of the writing content may be the actual content written by the user, which may be text, images or data in other formats, or in the form of code point image plus text. The writing time is the timestamp that records the user's writing. The processing unit may analyze the learning progress of the user based on the writing content and writing time of the user. Exemplarily, the writing template may be saved in a local database, and the user may copy the content of the writing template. The processing unit may determine the writing progress of the user in the writing template by identifying the writing content, and may also draw the writing line chart of the user combined with the writing time, reflecting the difference in writing volume within each period of time. The analysis may be realized by using machine learning algorithms to train the model and infer the learning progress based on the writing content of the user. Simple statistical methods may also be used, such as calculating the daily writing volume, weekly study time, and the like, to evaluate the learning progress of the user.

Figure 8:
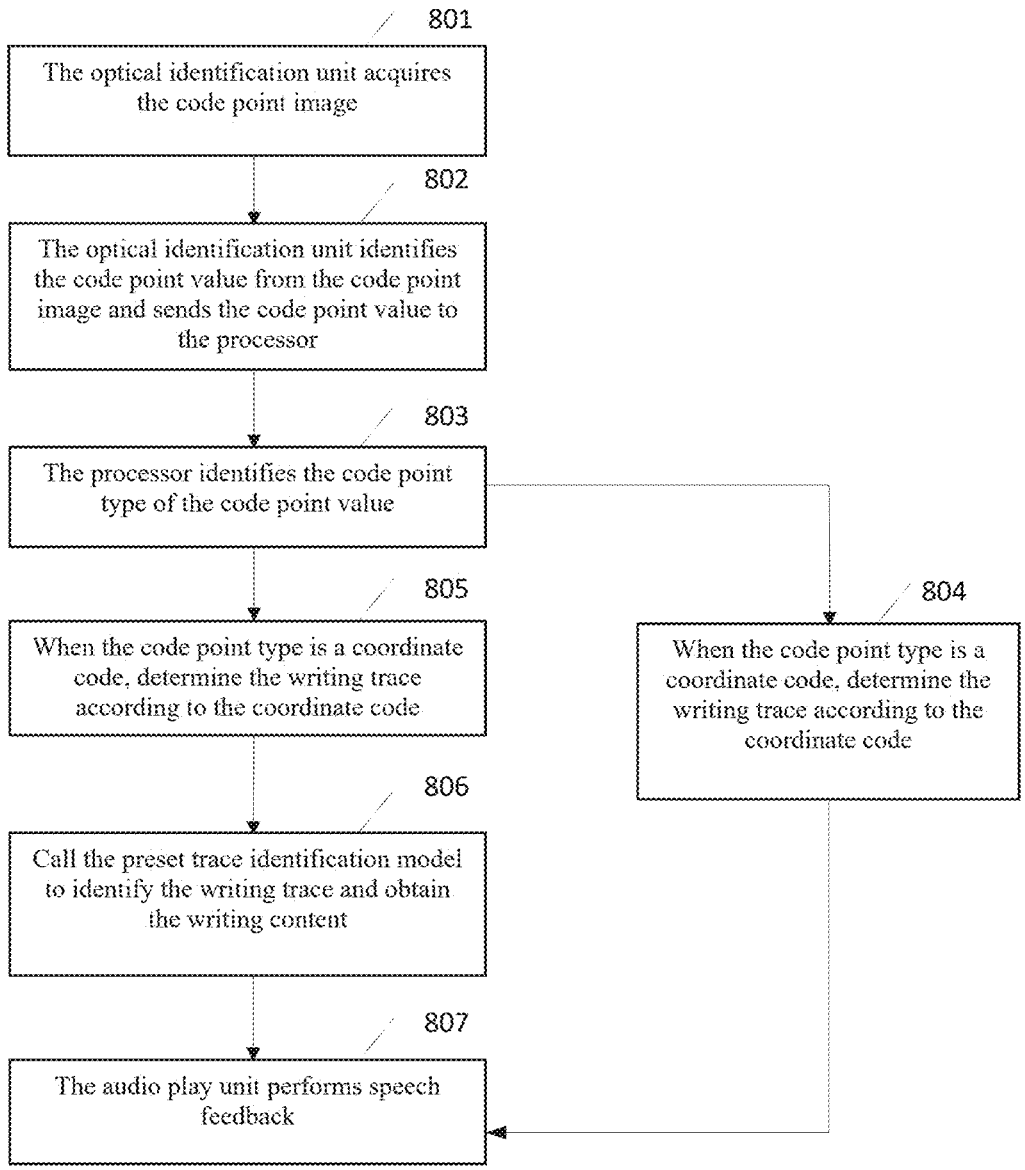
FIG. 8 is a schematic diagram showing a processing flow of a writing device assembly provided by an embodiment of the present disclosure.

In an example, the processing flow of the writing device assembly may refer to the schematic flowchart of broadcasting of the handwriting apparatus shown in FIG. 8. At step 801, the optical identification unit obtains the code point image. When the user performs writing on the writing medium or clicks the writing medium for reading, the optical identification unit scans the writing medium in real time to form a code point image. At step 802, the optical identification unit identifies the code point value from the code point image and sends the code point value to the processor. The optical identification unit may preprocess the code point image to obtain a preprocessed image, that is, perform preprocessing operations such as denoising and enhancing contrast on the captured code point image, and then identify the code point value of the preprocessed image to improve identification accuracy. At step 803, the processor identifies whether the code point type of the code point value is a coordinate code. If "Yes", then execute step 805. If "NO", then execute step 804. That is, the code point value sent to the processor by the optical identification unit may be the value of the coordinate code or the value of the click-to-read code. At step 804, the click-to-read content is identified from the local database according to the click-to-read code. The correspondence between the click-to-read code and the click-to-read content is pre-stored in the local database. The local database can be updated regularly or can be connected to the database of an external server. At step 805, the writing trace is determined according to the coordinate code. Each coordinate value is determined based on the coordinate code, and a writing trace is formed based on the coordinate value. At step 806, the preset trace identification model is called to identify the writing trace and obtain the writing content. The writing trace is input into the built-in identification model for analysis to identify the writing content (such as letters, numbers, and the like) through comparison and classification. At step 807, audio play unit performs speech feedback. When the writing content is identified, the audio processing unit converts the writing content into speech to be output. When the click-to-read content is identified, it is converted into a format suitable for play and then broadcast.

Students may use handwriting devices to write directly on books, and the handwriting devices may broadcast information in real time to assist memory and pronunciation practices. Teachers use LCD handwriting boards or whiteboards to teach, and handwriting devices are used as auxiliary teaching tools for broadcasting.

In the embodiment of the present disclosure, when receiving the pressure sensing signal sent by the pressure sensing unit, the processor obtains the code point image by photographing the code points in the writing medium by the optical identification unit. The code point type identification is performed on the code point image. When the code point type indicated by the code point image is a coordinate code, the code point image returned by the optical identification unit is continuously obtained to acquire a code point image sequence. The coordinate identification is performed on the code point image sequence to obtain a coordinate sequence, and a writing trace is drawn based on the coordinate sequence. The preset trace identification model is called to identify the writing trace and obtain the writing content. Through the above method, the writing apparatus can instantly identify the writing trace according to the coordinate code in the code point image, and use the built-in identification model to analyze the writing trace to determine the writing content. Based on this, the writing apparatus can instantly identify the writing content when the user writes, provide instant feedback on the writing content, and improve the functionality and practicality of the handwriting device.

The embodiments of the present disclosure are provided to more clearly illustrate the technical solutions of the present disclosure, and do not constitute a limitation on the technical solutions of the present disclosure. Those having ordinary skills in the art will know that with the evolution of technology and the emergence of new application scenarios, the technical solutions provided by the present disclosure are equally applicable to similar technical problems.

Those having ordinary skills in the art could understand that the technical solutions shown in the figures do not limit the embodiments of the present disclosure, and may include more or fewer steps than those shown in the figures, or combine certain steps, or have different steps.

The device embodiments described above are only illustrative, and the units described as separate components may or may not be physically separate, that is, they may be located in one place, or they can be distributed to multiple network units. Part or all of the modules may be selected according to actual needs to implement the objective of the solutions of these embodiments.

Those of ordinary skill in the art could understand that all or some steps in the above method, and functional modules/ units in the systems and the devices disclosed above can be implemented as software, firmware, hardware, and appropriate combinations thereof.

The terms such as "first", "second", "third", "fourth", and the like (if present) in the description of the present disclosure and the above-mentioned drawings are used to distinguish similar objects and are not necessarily used to describe specific order or sequence. It should be understood that the data so used are interchangeable under appropriate circumstances so that the embodiments of the present disclosure described herein can be practiced in sequences other than those illustrated or described herein. Furthermore, the terms such as "include" and "having" and any variations thereof are intended to cover non-exclusive inclusions. For example, processes, methods, systems, products, or devices that encompass a series of steps or units need not be limited to those steps or units that are clearly listed, and can instead include other steps or units not expressly listed or inherent to the processes, methods, products or devices.

It should be understood that in the present disclosure, the term "at least one" refers to one or more, and the term "a plurality of" refers to two or more. The term "and/or" is used to describe the relationship between associated objects, indicating that there can be three relationships. For example, "A and/or B" may mean there are three situations: only A, only B, and both A and B, where A and B may be singular or plural. The character "/" generally indicates that the related objects are in an "or" relationship. "At least one of the following" or similar expressions thereof refers to any combination of the following items, including any combination of a single item or a plurality of items. For example, at least one of a, b or c may mean a, b, c, "a and b", "a and c", "b and c", or "a and b and c", where a, b, c may be single or multiple.

In the several embodiments provided in the present disclosure, it should be understood that the disclosed devices and methods can be implemented in other ways. For example, the device embodiments described above are only illustrative. For example, the division of the above-mentioned units is only a logical function division. In actual implementation, there may be other division methods. For example, a plurality of units or components may be combined or may be integrated into another system, or some features can be ignored, or not implemented. On the other hand, the coupling or direct coupling or communication connection between the objects shown or discussed may be indirect coupling or communication connection through some interfaces, devices or units, which may be in electrical, mechanical or other forms.

The units described above as separate components may or may not be physically separate. The components shown as units may or may not be physical units, that is, they may be located in one place, or they may be distributed to a plurality of network units. Part or all of the modules may be selected according to actual needs to implement the objective of the solutions of these embodiments.

In addition, each functional unit in each embodiment of the present disclosure can be integrated into one processing unit, each unit can exist physically alone, or two or more units can be integrated into one unit. The above integrated units can be implemented in the form of hardware or software functional units.

The integrated units may be stored in a computer-readable storage medium if they are implemented in the form of software functional units and sold or used as independent products. Based on this, the technical solutions of the present disclosure or the part that contributes to the existing technologies or all or part of the technical solution may substantially be embodied in the form of a software product. The computer software product is stored in a storage medium, including multiple instructions for causing a computer device (which may be a personal computer, a server, or a network device, or the like) to execute all or part of the steps of the methods of each embodiment of the present disclosure. The aforementioned storage media include U disk, mobile hard disk, read-only memory (ROM), random access memory (RAM), magnetic disk or optical disk and other medium that can store programs.

The preferred embodiments of the present disclosure have been described above with reference to the accompanying drawings, but this does not limit the scope of rights of the embodiments of the present disclosure. Any modifications, equivalent substitutions and improvements made by those having ordinary skills in the art without departing from the scope and essence of the embodiments of the present disclosure shall fall within the scope of rights of the embodiments of the present disclosure.

What is claimed is:

1. A writing device assembly, comprising a writing apparatus and a writing medium, the writing apparatus comprising a pressure sensing unit, an optical identification unit and a processor, and the writing medium having code points printed thereon, wherein:

the pressure sensing unit is configured to generate a pressure sensing signal in response to sensing that the writing apparatus contacts the writing medium;

the optical identification unit is configured to, in response to that the pressure sensing unit generates the pressure sensing signal, capture a code point image of the code points in the writing medium, analyze the code point image to obtain a code point value, and send the code point value to the processor; and the processor is configured to identify a code point type of the code point value, and in response to the code point type being identified to be a coordinate code, perform a coordinate code analysis on the code point value, determine a writing trace according to analysis results, and perform content identification on the writing trace to obtain writing content;

wherein the pressure sensing unit comprises a writing component and a sensing component;

the writing component comprises a first end that contacts the writing medium during writing and a second end that is opposite to the first end; and the second end of the writing component is provided with a conductive silicone pad and a first magnetic device; the sensing component comprises a sensing terminal disposed opposite to the second end of the writing component, the sensing terminal is provided with a second magnetic device and unconnected first and second conductors, and the first magnetic device and the second magnetic device are disposed in magnetic repulsion; in response to the first end of the writing component being not in contact with the writing medium, the conductive silicone pad and the sensing terminal are separated under repulsion between the first magnetic device and the second magnetic device, the first conductor and the second conductor are not in conduction, so that no pressure sensing signal is generated; and in response to the first end of the writing component being in contact with the writing medium, and a contact pressure between the writing component and the writing medium being greater than the repulsion between the first magnetic device and the second magnetic device, the conductive silicone pad is in contact with the sensing terminal, so that the first conductor and the second conductor are in conduction to generate the pressure sensing signal; or the writing component comprises a first end that contacts the writing medium during writing and a second end that is opposite to the first end, and the writing component is provided with a sliding block at the second end of the writing component; the sensing component comprises a pressure sensor disposed opposite to the second end of the writing component; in response to the first end of the writing component being not in contact with the writing medium, the sliding block slides downward due to a gravity of the writing component, so that the sliding block is separated from the pressure sensor, and the pressure sensor does not generate the pressure sensing signal; and in response to the first end of the writing component being in contact with the writing medium, and a contact pressure between the writing component and the writing medium being greater than the gravity of the writing component, the sliding block moves upward to be in contact with the pressure sensor, so that the pressure sensor generates the pressure sensing signal.

2. The writing device assembly according to claim 1, wherein the writing apparatus further comprises an audio play unit configured to broadcast the writing content after the processor identifies the writing content.

3. The writing device assembly according to claim 2, wherein the processor is further configured to perform a semantic identification on the writing content to obtain writing semantics, and in response to the writing semantics indicating that the writing content is question data, generate answer data corresponding to the question data;

wherein the audio play unit is further configured to broadcast an answer audio corresponding to the answer data after the processor generates the answer data.

4. The writing device assembly according to claim 2, wherein the writing apparatus further comprises an audio acquisition unit, and in response to the processor determining that the code point type is a sound recording code by performing the code point type identification on the code point value, the processor is further configured to transmit a sound recording prompt voice to the audio play unit, and initiate a sound recording instruction to the audio acquisition unit;

the audio play unit is further configured to broadcast the sound recording prompt voice after receiving the sound recording prompt voice; and the audio acquisition unit is configured to perform sound recording after receiving the sound recording instruction and after the audio play unit plays the sound recording prompt voice.

5. The writing device assembly according to claim 2, wherein the audio play unit is further configured to, in response to receiving a question broadcast instruction, broadcast a question audio corresponding to the question broadcast instruction;

the processor is further configured to compare the writing content with an answer corresponding to the question audio to obtain an answer comparison result, and determine a comparison result audio according to the answer comparison result; and the audio play unit is further configured to broadcast the comparison result audio after the processor determines the comparison result audio.

6. The writing device assembly according to claim 2, wherein in response to the processor determining that the code point type is a click-to-read code by performing code point type identification on the code point value, the processor is further configured to determine click-to-read content according to the code point value; and the audio play unit is further configured to broadcast the click-to-read content after the processor determines the click-to-read content.

7. The writing device assembly according to claim 2, wherein the processor is further configured to analyze a writing angle based on an image sequence to obtain writing angle data, determine a real-time writing posture based on the writing angle data and the writing content, and generate a writing posture correction speech in response to a writing posture determination result indicating a wrong posture; and the audio play unit is further configured to broadcast the writing posture correction speech after the processor generates the writing posture correction speech.

8. The writing device assembly according to claim 1, wherein the writing device assembly further comprises a display module configured to display the writing content after the processor identifies the writing content.

9. A writing content identification method, applied to a processor in a writing apparatus of a writing device assembly, the method comprising:

continuously acquiring code point values returned by a optical identification unit to obtain a code point value sequence, wherein the code point values are obtained by analyzing code point images captured by the optical identification unit on code points in a writing medium;

performing code point type identification on the code point values, and in response to a code point type indicated by the code point values being a coordinate code, performing coordinate identification on the code point value sequence to obtain a coordinate sequence, and drawing a writing trace according to the coordinate sequence; and calling a preset trace identification model to identify the writing trace to obtain writing content;

wherein the writing device assembly comprises the writing apparatus and the writing medium, the writing apparatus comprises a pressure sensing unit, the optical identification unit and the processor, and the writing medium has the code points printed thereon, wherein:

the pressure sensing unit is configured to generate a pressure sensing signal in response to sensing that the writing apparatus contacts the writing medium;

the optical identification unit is configured to, in response to that the pressure sensing unit generates the pressure sensing signal, capture a code point image of the code points in the writing medium, analyze the code point image to obtain a code point value, and send the code point value to the processor; and the processor is configured to identify a code point type of the code point value, and in response to the code point type being identified to be the coordinate code, perform a coordinate code analysis on the code point value, determine the writing trace according to analysis results, and perform content identification on the writing trace to obtain the writing content;

wherein the pressure sensing unit comprises a writing component and a sensing component;

the writing component comprises a first end that contacts the writing medium during writing and a second end that is opposite to the first end; and the second end of the writing component is provided with a conductive silicone pad and a first magnetic device; the sensing component comprises a sensing terminal disposed opposite to the second end of the writing component, the sensing terminal is provided with a second magnetic device and unconnected first and second conductors, and the first magnetic device and the second magnetic device are disposed in magnetic repulsion; in response to the first end of the writing component being not in contact with the writing medium, the conductive silicone pad and the sensing terminal are separated under repulsion between the first magnetic device and the second magnetic device, the first conductor and the second conductor are not in conduction, so that no pressure sensing signal is generated; and in response to the first end of the writing component being in contact with the writing medium, and a contact pressure between the writing component and the writing medium being greater than the repulsion between the first magnetic device and the second magnetic device, the conductive silicone pad is in contact with the sensing terminal, so that the first conductor and the second conductor are in conduction to generate the pressure sensing signal; or the writing component comprises a first end that contacts the writing medium during writing and a second end that is opposite to the first end, and the writing component is provided with a sliding block at the second end of the writing component; the sensing component comprises a pressure sensor disposed opposite to the second end of the writing component; in response to the first end of the writing component being not in contact with the writing medium, the sliding block slides downward due to a gravity of the writing component, so that the sliding block is separated from the pressure sensor, and the pressure sensor does not generate the pressure sensing signal; and in response to the first end of the writing component being in contact with the writing medium, and a contact pressure between the writing component and the writing medium being greater than the gravity of the writing component, the sliding block moves upward to be in contact with the pressure sensor, so that the pressure sensor generates the pressure sensing signal.

* * * * *